United States Patent
Ablett et al.

[11] Patent Number: 5,329,761
[45] Date of Patent: Jul. 19, 1994

[54] COMBUSTOR DOME ASSEMBLY

[75] Inventors: Adrian M. Ablett, Cincinnati, Ohio; Clyde R. Draper, Saugus, Mass.; Steven C. Steffens, Cincinnati, Ohio

[73] Assignee: General Electric Company, Cincinnati, Ohio

[21] Appl. No.: 77,159

[22] Filed: Jun. 14, 1993

Related U.S. Application Data

[63] Continuation of Ser. No. 724,287, Jul. 1, 1991, abandoned.

[51] Int. Cl.$^5$ .............................................. F02C 3/06
[52] U.S. Cl. ..................................... 60/39.36; 60/746; 60/755
[58] Field of Search ............... 60/39.36, 733, 746, 60/755, 756, 757

[56] References Cited

U.S. PATENT DOCUMENTS

| | | | |
|---|---|---|---|
| 3,736,746 | 6/1973 | DuBell et al. | 60/39.36 |
| 3,750,397 | 8/1973 | Cohen et al. | 60/39.36 |
| 3,854,285 | 12/1974 | Stenger et al. | 60/39.66 |
| 3,990,232 | 11/1976 | Campbell | 60/39.66 |
| 4,194,358 | 3/1980 | Stenger | 60/39.06 |
| 4,222,230 | 9/1980 | Bobo et al. | 60/39.36 |
| 4,686,823 | 8/1987 | Coburn et al. | 60/39.32 |
| 4,843,825 | 7/1989 | Clark | 60/756 |
| 4,916,905 | 4/1990 | Havercrott et al. | 60/756 |
| 5,012,645 | 5/1991 | Reynolds | 60/754 |

FOREIGN PATENT DOCUMENTS

| | | |
|---|---|---|
| 0182687 | 10/1985 | European Pat. Off. . |
| 2221979 | 2/1990 | United Kingdom ............... 60/757 |

Primary Examiner—Richard A. Bertsch
Assistant Examiner—Michael I. Kocharov
Attorney, Agent, or Firm—Jerome C. Squillaro; Charles L. Moore, Jr.

[57] ABSTRACT

A combustor dome assembly includes an annular support plate fixedly joined to a combustion liner which confines combustion gases. The support plate includes a plurality of circumferentially spaced support openings for supporting respective carburetors, and respective splashplates fixedly joined coaxially to each of the support openings. Each of the splashplates includes an intermediate flared portion spaced axially downstream from an intermediate portion of the support plate to define a plenum, and a distal end spaced radially away from the liner to define a circumferential extending outlet gap in flow communication with the plenum. The support plate intermediate portion has a plurality of impingement holes disposed between the support openings and a proximal end of the support plate for channeling a first portion of compressed air as impingement air into the plenum to impinge against the splashplate intermediate portion. A plurality of circumferentially spaced air slots are disposed between the support plate proximal end and the liner for channeling a second portion of the compressed air therethrough and into the plenum for mixing with spent impingement air to form a cooling air film extending from the outlet gap along the liner for film cooling thereof.

13 Claims, 6 Drawing Sheets

COMBUSTOR DOME ASSEMBLY

This application is a continuation of application Ser. No. 07/724,287, filed Jul. 1, 1991, now abandoned.

TECHNICAL FIELD

The present invention relates generally to gas turbine engine combustors, and, more specifically, to an improved dome assembly having means for starting film cooling of a liner of the combustor.

BACKGROUND ART

A typical aircraft gas turbine engine combustor includes annular, radially spaced apart outer and inner combustion liners disposed coaxially about a longitudinal centerline axis to define an annular combustion zone therebetween. Disposed at the upstream ends of the liners is an annular combustor dome fixedly joined thereto and including a plurality of circumferentially spaced carburetors therein for providing a fuel/air mixture into the combustor which is ignited for generating combustion gases therein.

In order to protect the combustor from the hot combustion gases and provide a useful service life thereof, various means are used for cooling the dome and the liners including for example means for generating boundary layer films of cooling air along the inner surfaces of the combustor. Such film cooling must be provided from the dome and extend downstream along the full axial extent of the liners. The cooling air film is typically formed by a circumferentially extending conventional cooling nugget in the form of an annular plenum having a lip defining an annular outlet slot for discharging the cooling air film. The nugget includes a plurality of circumferentially space inlet holes typically located at a radius or apex of the nugget at an upstream end of the plenum. In conventional combustors, a plurality of axially spaced rows of the cooling nuggets are typically used for ensuring the continuation of an effective cooling air film along the entire axial and circumferential extent of the combustor liners.

Another type of combustor utilizes axially spaced rows of circumferentially spaced inclined multiholes for convectively cooling the liners as well as for providing the cooling air film along the inner surfaces thereof instead of using the conventional nuggets. However, in some multihole designs, the multiholes by themselves are unable to start an effective film of cooling air, and a conventional nugget or other means is provided for starting the cooling air film at the upstream end of the combustor immediately upstream of the first row of multiholes. An effective cooling air film in such an embodiment must be provided from the dome region of the combustor to ensure that the multiholes provide an effective cooling air film with an acceptable heat transfer rate. For example, one model test performed on behalf of the present assignee shows that the cooling effectiveness of a multihole liner alone as compared to a multihole liner having a cooling film starting slot at the upstream end thereof has initially about 10% of the cooling effectiveness compared thereto at the dome end of the combustor. The cooling effectiveness of the multihole-only liner increases along the liner in the downstream direction whereas the cooling effectiveness of the multihole liner with the cooling air film starting slot decreases in the downstream direction, with the film effectiveness of the latter being substantially greater than that of the former up to the last row of the multiholes in the liner.

The air used for providing a cooling air film in a combustor is a portion of compressor discharge air which necessarily decreases overall performance efficiency of the combustor since such air is not being directly used to support the combustion process. Furthermore, various conventional cooling air apertures exist in conventional combustors for providing cooling thereof including film cooling. Such various conventional structures have varying degrees of complexity, cost, undesirable weight, or stress concentrations, or efficiency of use of the available cooling air. For example, locating a cooling air aperture in the apex or radius of a plate typically results in a substantial stress concentration which must be accommodated, for example by increased thickness of the plate, for providing a useful life for the combustor. Furthermore, since combustor cooling air typically does not directly support the combustion process, the use thereof should be kept to a minimum to avoid overall performance efficiency losses of the combustor.

OBJECTS OF THE INVENTION

Accordingly, one object of the present invention is to provide a new and improved combustor dome assembly for a gas turbine engine.

Another object of the present invention is to provide a combustor dome assembly which more efficiently uses cooling air for increasing combustor efficiency.

Another object of the present invention is to provide a simpler and lighter combustor dome assembly.

Another object of the present invention is to provide a combustor dome assembly having new means for starting film cooling for a multihole combustor liner.

DISCLOSURE OF INVENTION

A combustor dome assembly includes an annular support plate fixedly joined to a combustion liner which confines combustion gases. The support plate includes a plurality of circumferentially spaced support openings for supporting respective carburetors, and respective splashplates fixedly joined coaxially to each of the support openings. Each of the splashplates includes an intermediate flared portion spaced axially downstream from an intermediate portion of the support plate to define a plenum, and a distal end spaced radially away from the liner to define a circumferential extending outlet gap in flow communication with the plenum. The support plate intermediate portion has a plurality of impingement holes disposed between the support openings and a proximal end of the support plate for channeling a first portion of compressed air as impingement air into the plenum to impinge against the splashplate intermediate portion. A plurality of circumferentially spaced air slots are disposed between the support plate proximal end and the liner for channeling a second portion of the compressed air therethrough and into the plenum for mixing with spent impingement air to form a cooling air film extending from the outlet gap along the liner for film cooling thereof.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawings in which:

MODE(S) FOR CARRYING OUT THE INVENTION

Figure 1:
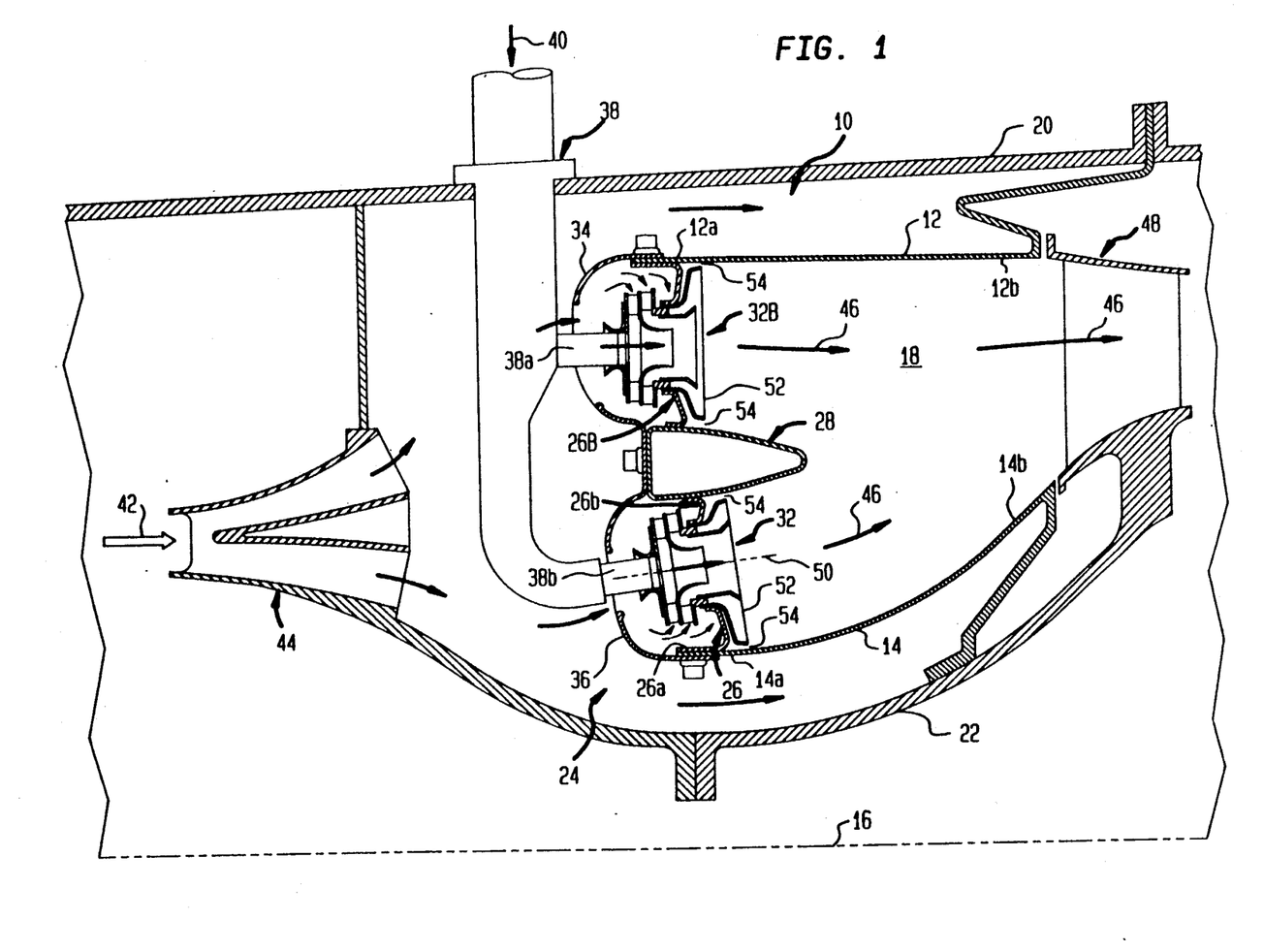
FIG. 1 is a schematic, longitudinal sectional view of an exemplary double annular combustor having a combustor dome assembly in accordance with one embodiment of the present invention.

Illustrated in FIG. 1 is an exemplary double annular combustor 10 for an aircraft turbofan gas turbine engine. The combustor 10 includes annular radially outer and inner combustion liners 12 and 14, respectively, disposed coaxially about a longitudinal centerline axis 16 of the combustor and spaced radially apart to define an annular combustion zone 18 therebetween. Each of the liners 12, 14 has an upstream end 12a and 14a, respectively, and downstream ends 12b and 14b, respectively, conventionally fixedly joined to annular outer and inner casings 20 and 22 of the combustor 10.

The combustor 10 also includes an annular combustor dome assembly 24 in accordance with one exemplary embodiment of the present invention conventionally fixedly joined to the liner upstream ends 12a and 14a by bolts for example. The dome assembly, or simply dome 24 includes at least one annular spec or support plate 26 having a radially inner proximal end 26a conventionally fixedly joined to the inner proximal end 14a, and a radially outer distal end 26b conventionally fixedly joined to an annular centerbody 28 by being either bolted or welded thereto for example.

In this exemplary embodiment of the combustor 10, it is in the form of a double annular combustor having both the radially inner support plate 26 and a substantially identical radially outer support plate 26B, with the inner support plate 26 being fixedly joined between the inner liner 14 and the centerbody 28, and the outer support plate 26B being similarly fixedly joined between the outer liner 12 and the centerbody 28. In an alternate embodiment, the inner and outer support plates 26, 26B can be a single piece extending from the inner liner 14 to the outer liner 12. The combustor dome assembly 24 in accordance with the present invention may be used also in conventional single annular combustors which would not include the outer support plate 26B or the centerbody 28, and in such an embodiment, the support plate distal end 26b would be suitably fixedly joined directly to the outer liner 12 by bolts for example. Accordingly, the invention will be further described with respect to the radially inner support plate 26 with it being understood that it applies equally well to the embodiment including the outer support plate 26B as well as other embodiments of combustors.

Figure 2:
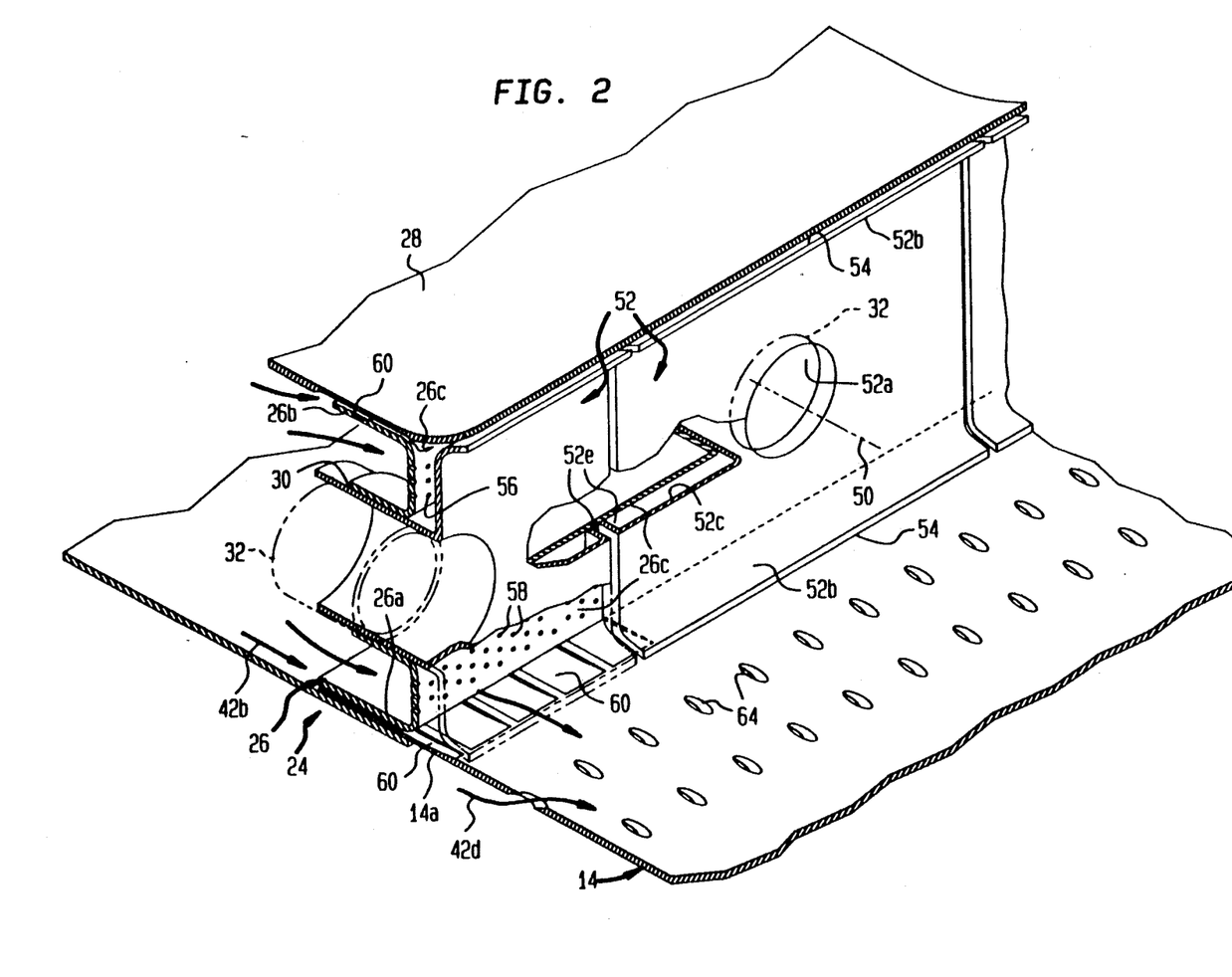
FIG. 2 is a perspective, partly sectional view of a portion of the radially inner portion of the combustor dome assembly illustrated in FIG. 1 shown with the carburetors thereof removed for clarity.

The support plate 26 also includes an annular intermediate portion 26c shown more specifically in FIG. 2 disposed radially between the proximal and distal ends 26a and 26b, which has a plurality of circumferentially spaced support openings 30 each for receiving and supporting a respective conventional carburetor 32 as shown in FIG. 1, with similar carburetors 32B being disposed in the outer support plate 26B.

The combustor 10 also includes annular outer and inner cowls 34 and 36, respectively, extending upstream from and fixedly joined to the liner upstream ends 12a and 14a, respectively, by the bolts for example. A fuel injector assembly 38 includes a radially outer fuel nozzle 38a and a radially inner fuel nozzle 38b conventionally disposed in the respective carburetors 32B and 32 for providing fuel 40 thereto. Compressor discharge air 42 is conventionally provided from a conventional compressor (not shown) to an annular diffuser 44 which channels the compressed air 42 through the cowls 34, 36 and into the carburetors 32, 32B wherein it is conventionally mixed with the fuel 40 from the nozzles 38a, 38b for forming a fuel/air mixture which is conventionally ignited for forming combustion gases 46 in the combustor 10. The combustion gases 46 are discharged from the combustor 10 through a conventional turbine nozzle 48 and then flow to a conventional high pressure turbine (not shown).

Portions of the compressed air 42 are channeled between the outer surfaces of the liners 12 and 14 and the inner surfaces of the casings 20 and 22 for cooling the combustor 10. The compressed air 42 is also channeled through the liners 12 and 14, i.e. through apertures not shown in FIG. 1, for providing conventional dilution of the combustion gases 46 as well as film cooling of the inner surfaces of the liners 12 and 14 for example.

Figure 3:
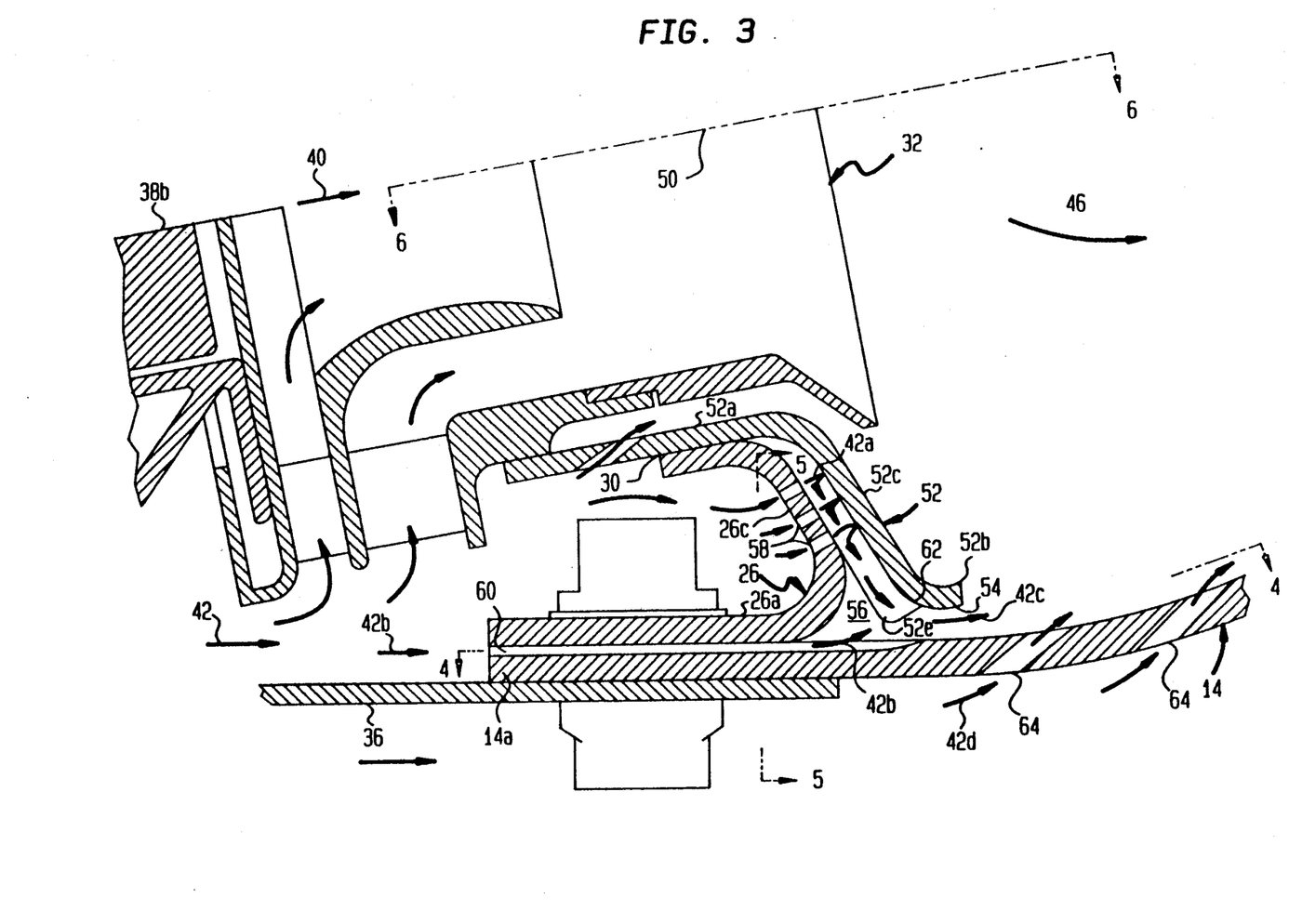
FIG. 3 is an enlarged longitudinal sectional view of the radially inner portion of the combustor dome assembly illustrated in FIG. 1 showing a portion of a carburetor, splashplate, and support plate joined to an upstream end of the radially inner combustion liner.

Illustrated in more particularity in FIGS. 2 and 3 is the inner support plate 26 and the inner carburetor 32 of the dome assembly 24 with it being understood that the description of the invention applies equally also to the outer support plate 26B and the outer carburetor 32B. Each of the support openings 30 has a longitudinal centerline axis 50 about which the carburetor 32 is disposed coaxially in the support opening 30. A plurality of annular heat shields or splashplates 52 each has a proximal end 52a fixedly and sealingly joined coaxially to a respective one of the support openings 30 by brazing for example; a distal end 52b spaced radially outwardly away from the inner surface of the liner 14 to define a circumferentially extending outlet gap 54; and an intermediate flared portion 52c spaced axially downstream from the support plate intermediate portion 26c and radially away from the liner 14 to define a circumferentially extending plenum 56 which is in flow communication with the outlet gap 54.

The support plate intermediate portion 26c is preferably flat and includes a plurality of circumferentially and radially spaced impingement holes 58 disposed between the support openings 30 and the support plate proximal end 26a for channeling a first portion of the compressed air 42 as impingement air jets 42a into the plenum 56 to impinge against the splashplate intermediate portion 52c for cooling thereof. A plurality of circumferentially spaced, axially extending air slots 60 are disposed between the support plate proximal end 26a and the liner upstream end 14a for channeling a second portion 42b of the compressed air 42 therethrough and into the plenum 56 for mixing with spent impingement air 42a which has firstly impinged against the splashplate intermediate portion 52c to form a cooling air film 42c extending from the outlet gap 54 along the inner surface of the liner 14 for film cooling the liner 14. The outer and inner liners 12, 14 have inner surfaces which face and confine the combustion gases 46 and the cooling air film 42c flows along the inner surfaces thereof to provide a protective cooling air boundary layer.

In this embodiment of the present invention, a conventional, relatively complex additional cooling air nugget is not used for providing the cooling air film 42c, but instead, the impingement holes 58, air slots 60, and outlet gap 54 are predeterminedly sized and configured for providing the cooling air film 42c from the outlet gap 54, as well as for providing impingement cooling of the splashplate 52 and increasing the transient temperature response of the support plate proximal end 26a at the liner upstream end 14a. More specifically, the impingement holes 58 are located in the flat support plate intermediate portion 26c and not in the curved apex portion thereof bridging the intermediate portion 26c and the proximal end 26a for reducing stress concentrations. The compressed air 42 is first channeled as the impingement air 42a for cooling the splashplate 52 and then flows into the plenum 56. The air second portion 42b is channeled through the air slots 60 for rapidly heating the flange joints formed by the support plate proximal end 26a, the liner upstream end 14a, and the cowl 36 during an engine acceleration to increase the transient temperature response or growth of the flange joint for reducing thermal stresses.

Similarly, on an engine decel, the air second portion 42b more quickly cools the flange joint for again reducing thermal stresses therein. The air second portion 42b is similarly then channeled into the plenum 56 wherein it is mixed with the spent impingement air 42a and discharged through the outlet gap 54 as the cooling air film 42c. In this way, the compressed air 42 is more efficiently utilized for not only providing the cooling air film 42c but also impingement cooling the splashplate 52 and increasing the transient response of the flange joint. Although the cooling air film 42c is hotter than it would be if provided by conventional cooling air nuggets provided directly with a portion of previously unused compressed air 42, it nevertheless is effective for providing film cooling of the liner 14.

In the exemplary embodiment illustrated in FIGS. 2 and 3, the liner upstream end 14a is substantially flat and the splashplate intermediate portion 52c at the distal end 52b is generally convex toward the plenum 56, or configured, to define a converging channel 62 for accelerating the spent impingement air 42a and the air second portion 42b mixed therewith from the plenum 56 and out the outlet gap 54 for creating a more effective cooling air film 42c. As illustrated in more particularity in FIG. 4, the air slots 60 are preferably configured for diffusing the air second portion 42b for providing a circumferentially uniform flow of the cooling air film 42c from the outlet gap 54. For example each of the air slots 60 includes a straight upstream end 60a having a constant width $W_1$, and a diverging downstream outlet portion 60b having a linearly increasing width from the first $W_1$ to a maximum width of $W_2$ at its outlet. In this way, the air second portion 42b spreads circumferentially more quickly upon discharge from the air slots 60 for improving the circumferential uniformity of the cooling air film 42c. Each side of the air slot outlet portion 60b has a half angle H, indicating its degree of divergence, which is less than about 15°, and preferably 10°, for providing diffusion of the air second portion 42b through the slots 60 without flow separation. Also in the embodiment illustrated in FIG. 4, each of the air slots 60 is preferably aligned parallel to the longitudinal centerline axis 16 of the combustor 10.

Figure 4:
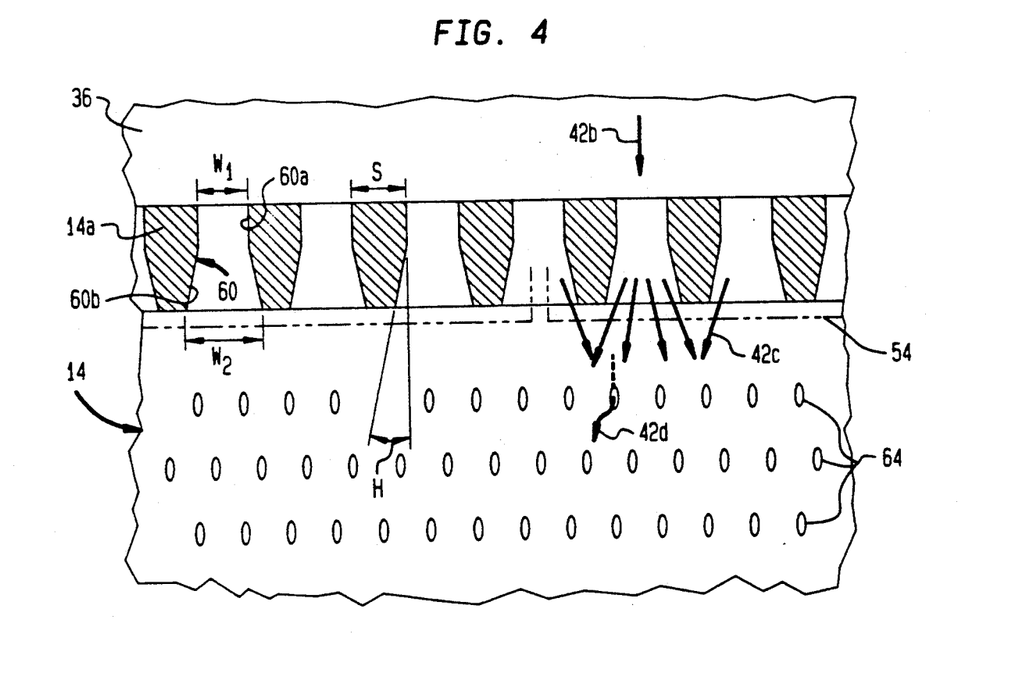
FIG. 4 is a partly sectional view of a portion of the combustor dome assembly illustrated in FIG. 3 taken along line 4—4.
Figure 5:
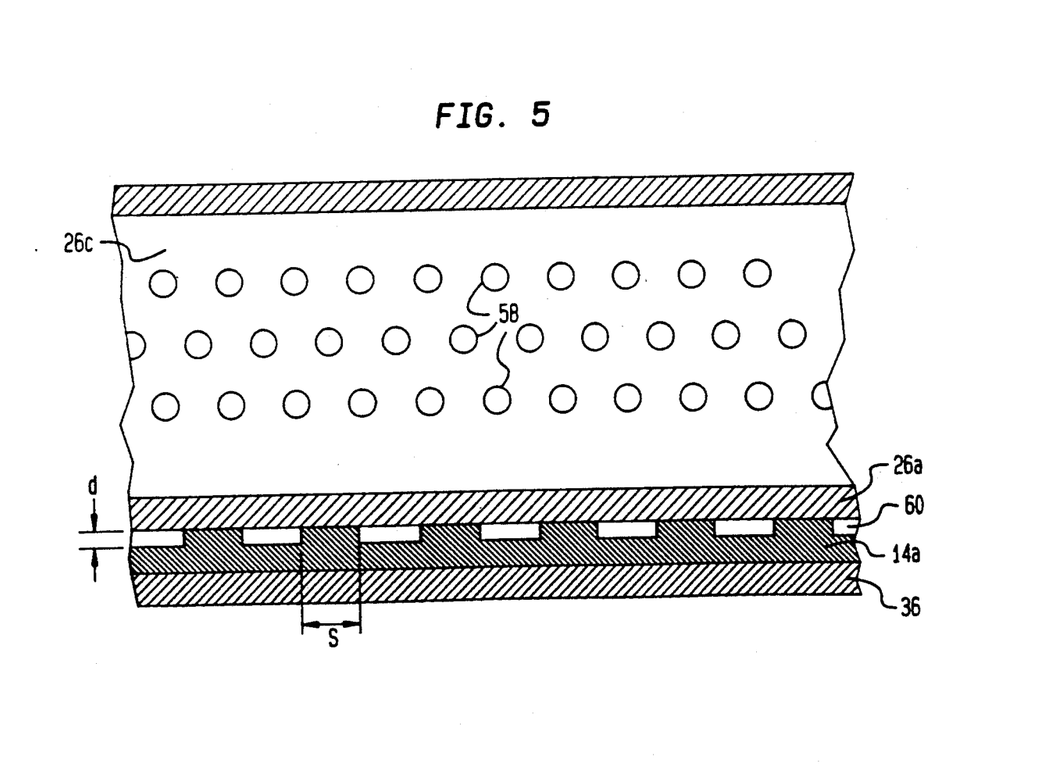
FIG. 5 is a partly sectional view of the combustor dome assembly illustrated in FIG. 3 taken along line 5—5.

The air slots 60 may have various configurations between the support plate proximal end 26a and the liner upstream end 14a, and for example, as illustrated in FIGS. 3-5, the air slots 60 are preferably disposed, or recessed, in the inner surface of the liner 14. They may be suitably machined or cast into the liner 14 to a suitable depth d of about 0.5 mm for example, and be suitably spaced apart at a distance S, as shown in FIG. 5, for providing effective thermal transient response of the flange joint as well as circumferential uniformity of the cooling air film 42c. The height of the outlet gap 54 in this exemplary embodiment is about 1.8 mm for providing an effective cooling air film 42c.

Figure 6:
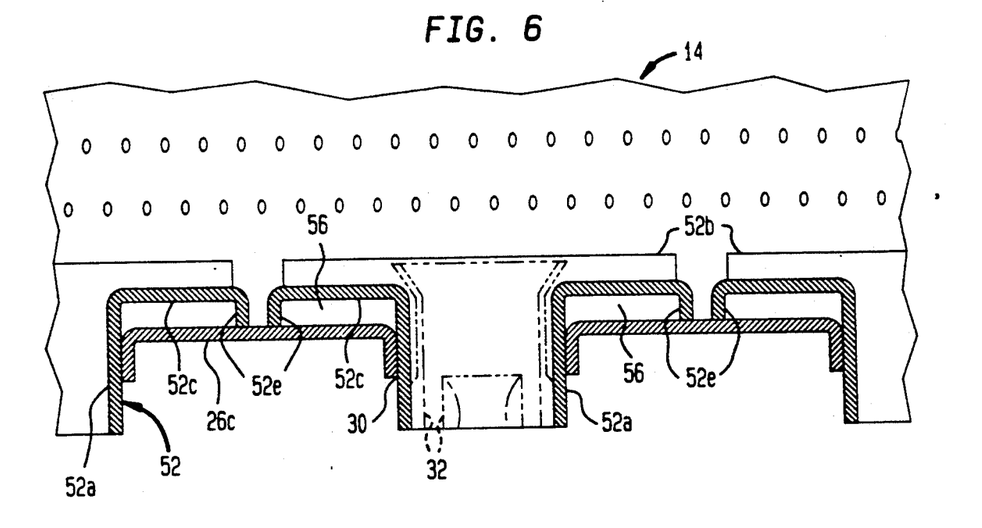
FIG. 6 is a partly sectional view of a portion of the combustor dome assembly illustrated in FIG. 3 taken along line 6—6.

Referring to FIGS. 2, 3, and 6, each of the splashplates 52 preferably includes radially extending, circumferentially spaced, opposite side edges 52e disposed in abutment with the support plate intermediate portion 26c for sealing leakage therethrough of the spent impingement air 42a and for confining the spent impingement air 42a to flow radially through the plenum 56 and out the outlet gap 54. As shown more particularly in FIG. 2, each of the splashplates 52 is annular about the centerline axis 50 with the proximal end 52a being tubular, and the intermediate portion 52c being generally rectangular. Each of the splashplates 52 has two distal ends 52b, one at the bottom and one at the top spaced radially away from the liner 14 and the centerbody 28 for example, to define respective outlet gaps 54. The two radially extending side edges 52e of each splashplate 52 are disposed adjacent to respective side edges 52e of circumferentially adjacent splashplates 52.

In a conventional splashplate, radially extending gaps are provided between the splashplates from which air can leak. However, in accordance with one object of the present invention, the splashplate side edges 52e may be formed, by bending for example, to not only space the splashplate intermediate portion 52c axially away from the support plate intermediate portion 26c but also to provide an effective side seal at the junction of the side edges 52e and the support plate intermediate portion 26c. In this way, the spent impingement air 42a discharged from the impingement holes 58 into the plenum 56 is confined to flow in a radial direction toward and out of the outlet gaps 54 for more efficiently utilizing the spent impingement air 42a in providing an effective cooling air film 42c from the outlet gaps 54.

As illustrated in FIGS. 2-4, the inner liner 14, as well as the outer liner 12 and the centerbody 28, may include in an exemplary embodiment a plurality of axially spaced rows of rearwardly inclined multiholes 64 disposed in the liner 14 downstream of the outlet gap 54 for channeling into the combustor 10 a third portion 42d of the compressed air 42 for both convectively and film cooling the liner 14. In the exemplary embodiment illustrated, the multiholes 64 alone are ineffective for providing a suitable cooling air film along the inner surface of the liner 14 for protection against the combustion gases 46. However, as described above, the impingement holes 58, the air slots 60, and the outlet gap 54 may be preferably sized for providing an effective cooling air film 42c for starting film cooling from the first row of multiholes 64. The starting cooling air film 42c then joins with the cooling air films 42d from the multiholes 64 for providing a continuous cooling air film from the outlet gap 54 and downstream over the entire axial length of the combustor 10.

Accordingly, the combustor dome assembly 24 of the present invention may be used in a new method of starting film cooling from the rows of the multiholes 64 which includes channeling the air first portion 42a through the impingement holes 58 to impinge against the splashplate intermediate portion 52c to form spent impingement air. The method further includes channeling the air second portion 42b through the air slots 60 and into the plenum 56 for mixing with the spent impingement air 42a therein. The method further includes discharging the mixed spent impingement air 42a and the air second portion 42b discharged from the air slots 60 from the plenum 56 and through the outlet gap 54 as the cooling air film 42c for starting film cooling from the rows of the multiholes 64.

In a preferred embodiment of the invention, the velocity of the cooling air film 42c discharged from the outlet gap 54 in the axial downstream direction is preferably about 2 to 3 times that of the velocity of the combustion gases 46 in the combustor 10, which relatively high velocity of the cooling air film 42c may be more efficiently obtained by utilizing both the cooling air first and second portions 42a and 42b combined in the plenum 56 and accelerated through the converging channel 62 to the outlet gap 54. Accordingly, the energy available in the compressed air 42 may be used for both impingement cooling the splashplate 52 and improving transient thermal response of the flange joint at the air slots 60, with suitable energy remaining therein for providing an effective cooling air film 42c. Since pressure drops occur across both the impingement holes 58 and the air slots 60 which necessarily reduce the velocity of the cooling air 42 being channeling therethrough, both the converging channel 62 and the seals provided by the splashplate side edges 52e are effective for improving the efficiency of channeling the compressed air 42 to the outlet gaps 54 for providing an effective cooling air film 42c.

Furthermore, since a plurality of circumferentially spaced air slots 60 feed the circumferentially extending plenum 56 and outlet gap 54, the air second portion 42c must be suitably circumferentially spread upon discharge from the air slot 60 as above described for providing a circumferentially uniform cooling air film 42c for effectively protecting the liner 14 as well as effectively starting film cooling from the multiholes 64 uniformly circumferentially around the liner 14.

Figure 7:
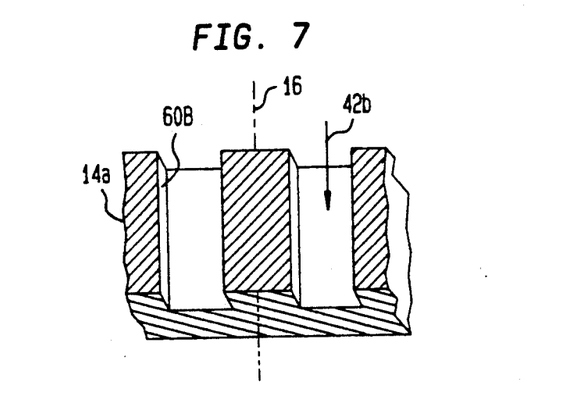
FIG. 7 is a perspective view of a portion of a liner having air slots in accordance with another embodiment of the present invention.
Figure 8:
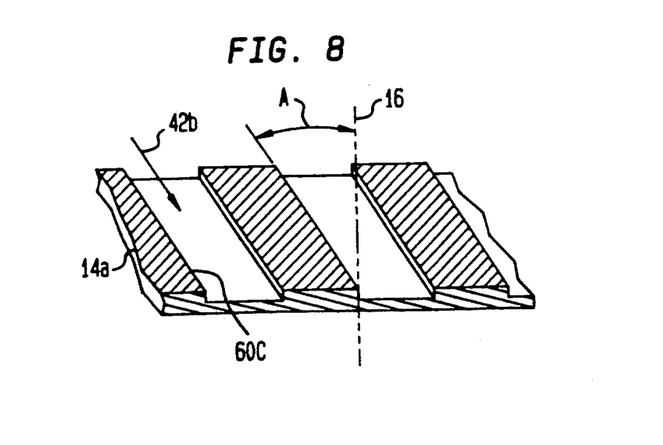
FIG. 8 is a perspective view of a portion of a liner having air slots in accordance with another embodiment of the present invention.
Figure 9:
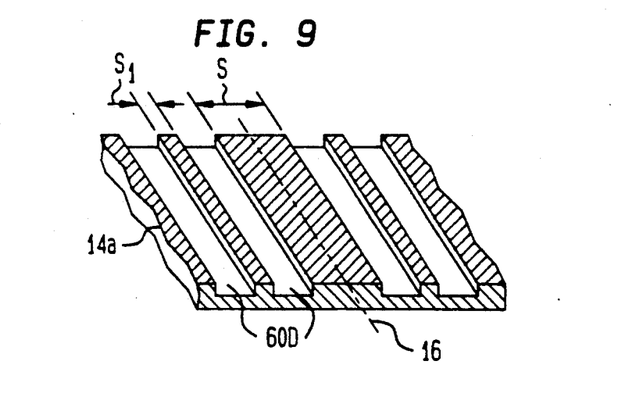
FIG. 9 is a perspective view of a portion of a liner having air slots in accordance with another embodiment of the present invention.
Figure 10:
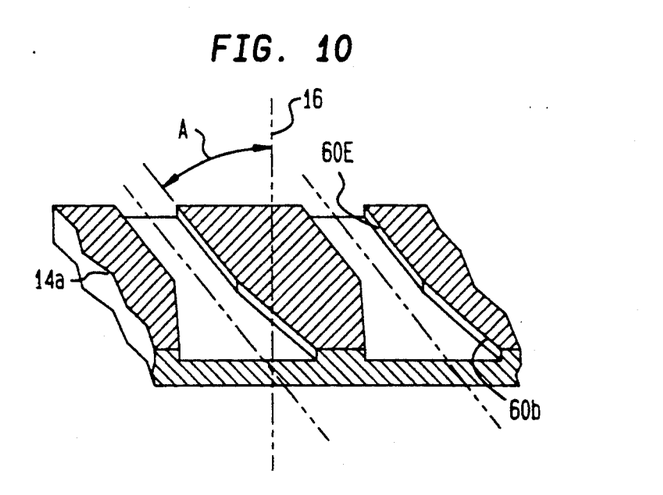
FIG. 10 is a perspective view of a portion of a liner having air slots in accordance with another embodiment of the present invention.

Although diverging air slots 60 disposed parallel to the combustor centerline axis 16 are illustrated in the preferred embodiment, including FIG. 4, alternate configurations of the air slots 60 may also be used as shown in FIGS. 7-10. For example, illustrated in FIG. 7 is an embodiment wherein the air slots, designated 60B simply have straight sides aligned parallel to the combustor longitudinal axis 16 and suitably closely spaced to each other for collectively providing a circumferentially uniform cooling air film 42c when mixed with the spent impingement air 42a. In FIG. 8, each of the straight air slots, designated 60C, may be aligned at an acute angle A relative to the longitudinal centerline axis 16 of the combustor 10. In FIG. 9, the air slots may be in the form of two relatively narrow slots 60D, or double slots, closely circumferentially spaced relative to each other at a distance $S_1$ with the circumferential spacing S between adjacent ones of the double slots 60D being generally equal to that of the diverging air slots 60 illustrated in FIG. 5. And, in FIG. 10, the air slots designated 60E may combine the acute angle A orientation of the centerline thereof as shown in FIG. 8 with the diverging outlet portion 60b as shown in FIG. 4. Other configurations and combinations of configurations of the air slots 60 may also be used for both providing effective transient thermal response of the flange joint defined at the air slot 60 as well as providing the air second portion 42b into the plenum 56 for providing an effective and circumferentially uniform cooling air film 42c from the outlet gap 54. Slot size, shape, and configuration may be suitably adjusted to optimize any particular design.

As disclosed above, the combustor dome assembly 24 may be configured for providing a respective outlet gap 54 at the upstream end of the inner surface of the radial inner liner 14, as well as at the upstream end of the inner surface of the outer liner 12, and at both upstream ends of the outer surface of the centerbody 28 for providing film cooling thereof. The resulting combustor dome assembly 24 has reduced weight, complexity, and manufacturing cost in comparison to using conventional film cooling air starting means including nuggets, and eliminates small-hole stress concentrations in high stress areas of the dome such as at the apex joining the support plate proximal end 26a to the support plate intermediate portion 26c. And, most significantly, more efficient use is made of the compressed air 42 channeled firstly and separately through both the impingement holes 58 and the air slots 60 and then collectively through the outlet gaps 54 for providing film cooling of the combustor liners facing and confining the combustion gases 46 therein.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A combustor dome assembly for an annular gas turbine engine combustor having a liner for facing and confining combustion gasses, comprising:
    an annular support plate attached to said liner and having a plurality of circumferentially spaced support openings formed therein each for supporting a respective carburetor;

a plurality of splashplates each having a center opening fixedly joined coaxially to a respective one of said support openings of said support plate, each of said splashplates having opposite side edges extending axially upstream from said splashplate and in abutment with said support plate to space said splashplate axially downstream from said support plate and radially away from said liner to define respectively a plenum and an outlet gap between said splashplate and said liner in flow communication with said plenum;

said support plate also having a plurality of impingement holes formed therein for channeling a first portion of compressed air as impingement air into said plenum to impinge against said splashplate, said opposite side edges of each of said splashplates sealing leakage therethrough of the impingement air and confining the impingement air to flow radially through said plenum, out said outlet gap and across said liner; and a plurality of circumferentially spaced, axially extending air slots disposed between said support plate and said liner for channeling a second portion of said compressed air therethrough and into said plenum for mixing with spent impingement air to form a cooling air film starter flowing through said outlet gap and along said liner.

2. A combustor dome assembly according to claim 1 wherein said air slots are configured for diffusing said air second portion for providing a circumferentially uniform flow of said cooling air film from said outlet gap.

3. A combustor dome assembly according to claim 2, further including:

a plurality of axially spaced rows of inclined multiholes disposed in said liner downstream of said outlet gap for channeling into said combustor a portion of said compressed air for film cooling said liner thereof; and said cooling air film is effective for starting film cooling from said multihole rows.

4. A combustor dome assembly according to claim 3, wherein said splashplate intermediate portion and said liner are configured to define a converging channel for accelerating said spent impingement air and said air second portion from said plenum and out said outlet gap.

5. A combustor dome assembly according to claim 4, wherein each of said air slots includes a diverging outlet portion.

6. A combustor dome assembly according to claim 5, wherein each of said air slots is aligned parallel to a longitudinal centerline axis of said combustor.

7. A combustor dome assembly according to claim 1, wherein said impingement holes, air slots, and outlet gap are sized and configured for impingement cooling said splashplate, increasing transient temperature response of said support plate proximal end at said liner, and providing said cooling air film from said outlet gap.

8. A combustor dome assembly according to claim 7 wherein said splashplate intermediate portion and said liner are configured to define a converging channel for accelerating said spent impingement air and said air second portion from said plenum and out said outlet gap.

9. A combustor dome assembly according to claim 7 wherein said air slots are configured for diffusing said air second portion for providing a circumferentially uniform flow of said cooling air film from said outlet gap.

10. A combustor dome assembly according to claim 7 wherein each of said air slots includes a diverging outlet portion.

11. A combustor dome assembly according to claim 7 wherein each of said air slots is aligned parallel to a longitudinal centerline axis of said combustor.

12. A combustor dome assembly according to claim 7 wherein each of said air slots is aligned at an acute angle relative to a longitudinal centerline axis of said combustor.

13. A combustor dome assembly according to claim 7 wherein said air slots are disposed in a surface of said liner.

* * * * *